US009865897B2

(12) United States Patent
Maleki et al.

(10) Patent No.: US 9,865,897 B2
(45) Date of Patent: Jan. 9, 2018

(54) STACKED ELECTROCHEMICAL CELL WITH INCREASED ENERGY DENSITY

(71) Applicant: GOOGLE TECHNOLOGY HOLDINGS LLC, Mountain View, CA (US)

(72) Inventors: Hossein Maleki, Duluth, GA (US); Jerald Hallmark, Sugar Hill, GA (US); Jason Howard, Alpharetta, GA (US)

(73) Assignee: Google LLC, Mountain View, CA (US)

( * ) Notice: Subject to any disclaimer, the term of this patent is extended or adjusted under 35 U.S.C. 154(b) by 234 days.

(21) Appl. No.: 14/293,182

(22) Filed: Jun. 2, 2014

(65) Prior Publication Data
US 2015/0349372 A1 Dec. 3, 2015

(51) Int. Cl.
*H01M 10/04* (2006.01)
*H01M 10/0587* (2010.01)
*H01M 4/04* (2006.01)
*H01M 10/052* (2010.01)

(52) U.S. Cl.
CPC ... *H01M 10/0431* (2013.01); *H01M 10/0587* (2013.01); *H01M 10/052* (2013.01); *H01M 2220/30* (2013.01); *Y10T 29/49117* (2015.01)

(58) Field of Classification Search
None
See application file for complete search history.

(56) References Cited

U.S. PATENT DOCUMENTS 2,499,663 A 3/1950 Medlar
2,529,038 A 11/1950 Medlar et al.
2,563,234 A 8/1951 Godshalk et al.
2,627,060 A 1/1953 Berg
2,637,836 A 5/1953 Kendall et al.
(Continued)

FOREIGN PATENT DOCUMENTS

DE 10118189 11/2002
EP 1298809 4/2003
(Continued)

OTHER PUBLICATIONS

"3GTPP TS 36.213 V9.3.0 3rd Generation Partnership Project Technical Specification Group Radio Access Network", Evolved Universal Terrestrial Radio Access (E-UTRA); Physical layer procedures (Release 9), Sep. 2010, 80 pages.
(Continued)

*Primary Examiner* — Barbara L Gilliam
*Assistant Examiner* — Adam A Arciero
(74) *Attorney, Agent, or Firm* — Colby Nipper

(57) ABSTRACT

An electrochemical cell assembly (500) includes a first cell and a second cell. The first cell can include a first anode (503) and a first cathode (504), wound in a first jellyroll assembly (501) with a first jellyroll assembly exterior defined by the first cathode. The second cell can include a second anode (512) and a second cathode (513), wound in a second jellyroll assembly (502) with a second jellyroll assembly exterior defined by the second anode. The first cell and the second cell can be arranged in a housing with the first jellyroll assembly exterior adjacent to the second jellyroll assembly exterior to improve energy density. The first cell assembly and the second cell assembly can have different widths to create differently shaped cell assemblies.

20 Claims, 8 Drawing Sheets

(56) References Cited

U.S. PATENT DOCUMENTS

| | | |
|---|---|---|
| 3,678,363 A | 7/1972 | Ringle |
| 4,061,956 A | 12/1977 | Brown et al. |
| 4,082,097 A | 4/1978 | Mann et al. |
| 4,629,965 A | 12/1986 | Fallon et al. |
| 4,649,333 A | 3/1987 | Moore |
| 4,692,682 A | 9/1987 | Lane et al. |
| 4,712,055 A | 12/1987 | Houser, Jr. |
| 4,727,306 A | 2/1988 | Misak et al. |
| 4,745,349 A | 5/1988 | Palanisamy et al. |
| 5,012,176 A | 4/1991 | LaForge |
| 5,136,231 A | 8/1992 | Faulk |
| 5,166,596 A | 11/1992 | Goedken |
| 5,172,044 A | 12/1992 | Sasaki et al. |
| 5,179,335 A | 1/1993 | Nor |
| 5,185,566 A | 2/1993 | Goedken |
| 5,363,031 A | 11/1994 | Miller et al. |
| 5,481,175 A | 1/1996 | Qualich et al. |
| 5,504,416 A | 4/1996 | Holloway et al. |
| 5,523,667 A | 6/1996 | Feldstein |
| 5,600,230 A | 2/1997 | Dunstan |
| 5,640,059 A | 6/1997 | Kammiller et al. |
| 5,656,920 A | 8/1997 | Cherng et al. |
| 5,731,694 A | 3/1998 | Wilcox et al. |
| 5,736,834 A | 4/1998 | Kuno |
| 5,804,944 A | 9/1998 | Alberkrack et al. |
| 5,815,389 A | 9/1998 | Plow et al. |
| 5,900,718 A | 5/1999 | Tsenter |
| 6,094,033 A | 7/2000 | Ding et al. |
| 6,144,186 A | 11/2000 | Thadiwe et al. |
| 6,236,189 B1 | 5/2001 | Franke |
| 6,275,006 B1 | 8/2001 | Kolke et al. |
| 6,298,233 B1 | 10/2001 | Souissi |
| 6,330,455 B1 | 12/2001 | Ichihara |
| 6,470,003 B1 | 10/2002 | Smith et al. |
| 6,495,992 B1 | 12/2002 | Pavlovic |
| 6,639,462 B1 | 10/2003 | Luu |
| 6,771,051 B2 | 8/2004 | Oglesbee et al. |
| 6,803,746 B2 | 10/2004 | Aker et al. |
| 6,850,040 B2 | 2/2005 | Xiong et al. |
| 6,917,182 B2 | 7/2005 | Burton et al. |
| 6,927,555 B2 | 8/2005 | Johnson |
| 7,146,139 B2 | 12/2006 | Nevermann |
| 7,151,411 B2 | 12/2006 | Martin et al. |
| 7,158,804 B2 | 1/2007 | Kumaran et al. |
| 7,170,341 B2 | 1/2007 | Conrad et al. |
| 7,301,308 B2 | 11/2007 | Aker et al. |
| 7,549,177 B2 | 6/2009 | Diefenbaugh et al. |
| 7,724,194 B2 | 5/2010 | Black et al. |
| 8,013,674 B2 | 9/2011 | Drogi et al. |
| 8,054,039 B2 | 11/2011 | Bauerle et al. |
| 8,155,081 B1 | 4/2012 | Mater et al. |
| 8,204,446 B2 | 6/2012 | Scheer et al. |
| 8,232,685 B2 | 7/2012 | Perper et al. |
| 8,269,467 B2 | 9/2012 | Li et al. |
| 8,278,871 B2 | 10/2012 | Kallmyer |
| 8,288,994 B2 | 10/2012 | Jakes et al. |
| 8,427,011 B2 | 4/2013 | Jung et al. |
| 8,436,492 B2 | 5/2013 | Jung et al. |
| 8,538,428 B2 | 9/2013 | Bartlett |
| 8,552,593 B2 | 10/2013 | Jung et al. |
| 8,552,693 B2 | 10/2013 | Paryani |
| 8,592,065 B2 | 11/2013 | Bhardwaj et al. |
| 8,624,546 B2 | 1/2014 | Jung et al. |
| 8,643,342 B2 | 2/2014 | Mehta et al. |
| 8,754,614 B2 | 6/2014 | Paryani et al. |
| 8,760,010 B2 | 6/2014 | Jung et al. |
| 8,805,764 B1 | 8/2014 | Rhines et al. |
| 9,246,454 B2 | 1/2016 | Schirmann et al. |
| 9,356,461 B2 | 5/2016 | Howard et al. |
| 9,419,457 B2 | 8/2016 | Robinson et al. |
| 9,472,965 B2 | 10/2016 | Nilles |
| 9,491,706 B2 | 11/2016 | Thorson et al. |
| 9,596,653 B2 | 3/2017 | Black et al. |
| 2001/0017602 A1 | 8/2001 | Hieb |
| 2003/0085684 A1 | 5/2003 | Tsukamoto et al. |
| 2003/0189417 A1 | 10/2003 | Dias et al. |
| 2003/0228875 A1 | 12/2003 | Alapuranen |
| 2003/0228891 A1 | 12/2003 | Kobayashi et al. |
| 2004/0075494 A1 | 4/2004 | Klomsdorf et al. |
| 2004/0117330 A1 | 6/2004 | Ehlers et al. |
| 2004/0176125 A1 | 9/2004 | Lee |
| 2004/0222769 A1 | 11/2004 | Al-Anbuky et al. |
| 2004/0257040 A1 | 12/2004 | Xiong et al. |
| 2005/0017677 A1 | 1/2005 | Burton et al. |
| 2005/0030094 A1 | 2/2005 | Conrad et al. |
| 2005/0046387 A1 | 3/2005 | Aker et al. |
| 2005/0168193 A1 | 8/2005 | Xiong et al. |
| 2005/0253561 A1 | 11/2005 | Tibbs |
| 2006/0028176 A1 | 2/2006 | Tang et al. |
| 2006/0158156 A1 | 7/2006 | Gamboa |
| 2006/0269835 A1* | 11/2006 | Song ............... H01M 2/046 429/142 |
| 2007/0069735 A1 | 3/2007 | Graf et al. |
| 2007/0188139 A1 | 8/2007 | Hussain et al. |
| 2008/0074084 A1 | 3/2008 | Lee et al. |
| 2008/0154624 A1 | 6/2008 | O'Neil |
| 2008/0197711 A1 | 8/2008 | Kato et al. |
| 2008/0211455 A1 | 9/2008 | Park et al. |
| 2008/0303480 A1 | 12/2008 | Prutchi et al. |
| 2009/0102294 A1 | 4/2009 | Hodges et al. |
| 2009/0131074 A1 | 5/2009 | Minier |
| 2009/0206797 A1 | 8/2009 | Chueh et al. |
| 2009/0295226 A1 | 12/2009 | Hodges et al. |
| 2009/0305121 A1* | 12/2009 | Yoon ............... H01M 10/0431 429/94 |
| 2100/0033138 | 2/2010 | Alger et al. |
| 2010/0085010 A1 | 4/2010 | Suzuki et al. |
| 2010/0127666 A1 | 5/2010 | Ball |
| 2010/0127889 A1 | 5/2010 | Vogel et al. |
| 2010/0156355 A1 | 6/2010 | Bauerle et al. |
| 2010/0198423 A1 | 8/2010 | Hirst |
| 2010/0198713 A1 | 8/2010 | Forbes et al. |
| 2010/0225272 A1 | 9/2010 | Kirby et al. |
| 2010/0233989 A1 | 9/2010 | Constien et al. |
| 2010/0266066 A1 | 10/2010 | Takahashi |
| 2010/0283691 A1 | 11/2010 | Su et al. |
| 2011/0012562 A1 | 1/2011 | Paryani |
| 2011/0018346 A1 | 1/2011 | Dixon |
| 2011/0037439 A1 | 2/2011 | Bhardwaj et al. |
| 2011/0070848 A1 | 3/2011 | Reddy |
| 2011/0071597 A1 | 3/2011 | Aghassian |
| 2011/0090126 A1 | 4/2011 | Szini et al. |
| 2011/0119005 A1 | 5/2011 | Majima et al. |
| 2011/0121836 A1 | 5/2011 | Kim et al. |
| 2011/0140538 A1 | 6/2011 | Jung et al. |
| 2011/0151942 A1 | 6/2011 | Hanley et al. |
| 2011/0156661 A1 | 6/2011 | Mehta et al. |
| 2011/0222469 A1 | 9/2011 | Ali et al. |
| 2011/0275369 A1 | 11/2011 | Bartlett et al. |
| 2011/0291619 A1 | 12/2011 | Asakura |
| 2011/0316475 A1 | 12/2011 | Jung et al. |
| 2012/0021800 A1 | 1/2012 | Wilson et al. |
| 2012/0032646 A1 | 2/2012 | Lee |
| 2012/0071195 A1 | 3/2012 | Chakraborty et al. |
| 2012/0146576 A1 | 6/2012 | Partovi |
| 2012/0147801 A1 | 6/2012 | Ho et al. |
| 2012/0210325 A1 | 8/2012 | de Lind Van Wijngaarden et al. |
| 2012/0213172 A1 | 8/2012 | Kim et al. |
| 2012/0235636 A1 | 9/2012 | Partovi |
| 2012/0242906 A1 | 9/2012 | Shintani et al. |
| 2013/0020862 A1 | 1/2013 | Miller |
| 2013/0069658 A1 | 3/2013 | Rich et al. |
| 2013/0121194 A1 | 5/2013 | Heshmati |
| 2013/0122827 A1 | 5/2013 | Ali et al. |
| 2013/0169348 A1 | 7/2013 | Shi |
| 2013/0237254 A1 | 9/2013 | Papakipos et al. |
| 2013/0249479 A1 | 9/2013 | Partovi |
| 2013/0257359 A1 | 10/2013 | Sakai et al. |
| 2014/0018077 A1 | 1/2014 | Zhong et al. |
| 2014/0068288 A1 | 3/2014 | Robinson et al. |
| 2014/0070761 A1 | 3/2014 | Labbe et al. |
| 2014/0070762 A1 | 3/2014 | Jenwatanavet et al. |
| 2014/0084856 A1 | 3/2014 | Howard et al. |
| 2014/0092243 A1 | 4/2014 | Ichikawa |

(56) References Cited

U.S. PATENT DOCUMENTS

| | | | |
|---|---|---|---|
| 2014/0097671 A1 | 4/2014 | Nakamura et al. | |
| 2014/0176067 A1 | 6/2014 | Suzuki et al. | |
| 2014/0232330 A1 | 8/2014 | Robertson et al. | |
| 2014/0253023 A1 | 9/2014 | Paryani | |
| 2014/0266462 A1 | 9/2014 | Schirmann et al. | |
| 2014/0274188 A1 | 9/2014 | Thorson et al. | |
| 2015/0063181 A1 | 3/2015 | Haro et al. | |
| 2015/0064528 A1* | 3/2015 | Liu | H01M 2/1673 429/94 |
| 2015/0079933 A1 | 3/2015 | Smith et al. | |
| 2015/0092676 A1 | 4/2015 | Periyalwar et al. | |
| 2015/0234054 A1 | 8/2015 | Lennen et al. | |
| 2015/0236800 A1 | 8/2015 | Tipton et al. | |
| 2015/0358851 A1 | 12/2015 | Toda | |
| 2015/0379533 A1 | 12/2015 | Alberth et al. | |
| 2016/0043752 A1 | 2/2016 | Slater et al. | |
| 2016/0072326 A1 | 3/2016 | Nilles | |
| 2016/0100364 A1 | 4/2016 | Bitar et al. | |
| 2017/0033584 A1 | 2/2017 | Nilles | |

FOREIGN PATENT DOCUMENTS

| | | |
|---|---|---|
| EP | 1505725 | 7/2009 |
| EP | 2077682 | 7/2009 |
| EP | 2222371 | 5/2011 |
| EP | 2595269 | 5/2013 |
| JP | H09247852 | 9/1997 |
| JP | 2003333200 | 11/2003 |
| WO | WO-9306682 | 4/1993 |
| WO | WO-2011084367 | 7/2011 |
| WO | WO-2011090769 | 7/2011 |
| WO | 2013152149 A1 | 10/2013 |

OTHER PUBLICATIONS

"Ex Parte Quayle Action", U.S. Appl. No. 13/625,976, filed Dec. 11, 2015, 11 pages.
"Ex Parte Quayle Action", U.S. Appl. No. 14/108,544, filed Apr. 23, 2015, 8 pages.
"Ex Parte Quayle Action", U.S. Appl. No. 14/451,950, filed Aug. 4, 2015, 7 pages.
"Final Office Action", U.S. Appl. No. 13/477,609, dated Jul. 31, 2015, 11 pages.
"Final Office Action", U.S. Appl. No. 13/625,976, dated Jun. 5, 2015, 40 pages.
"Final Office Action", U.S. Appl. No. 13/798,682, dated Jul. 30, 2015, 12 pages.
"First Choice Power", http://www.firstchoicepower.com/plans-services/electricity-plans/variable-rate-electricity-plans.aspx—Retrieved on May 18, 2012, 1 page.
"How Does Prepaid Electricity Work", http://www.mxenergy.com/does-prepaid-electricity-work-a-19.html—Retrieved on Jan. 15, 2012, 3 pages.
"International Preliminary Report on Patentability", Application No. PCT/US2013/054623, dated Apr. 9, 2015, 12 pages.
"International Preliminary Report on Patentability", Application No. PCT/US2013/060170, dated Mar. 24, 2015, 6 pages.
"International Preliminary Report on Patentability", Application No. PCT/US2013/042042, dated Mar. 10, 2015, 8 pages.
"International Preliminary Report on Patentability", Application No. PCT/US2014/014994, dated Sep. 15, 2015, 8 pages.
"International Search Report and Written Opinion", Application No. PCT/US2014/070384, dated Mar. 13, 2015, 12 pages.
"International Search Report and Written Opinion", Application No. PCT/US2014/014994, dated Mar. 21, 2014, 12 pages.
"International Search Report and Written Opinion", Application No. PCT/US2013/054623, dated May 14, 2014, 14 pages.
"International Search Report and Written Opinion", Application No. PCT/US2013/040242, dated Oct. 4, 2013, 14 pages.
"International Search Report and Written Opinion", Application No. PCT/US2014/018479, dated Jul. 22, 2014, 17 pages.
"International Search Report and Written Opinion", Application No. PCT/US2013/060170, dated Dec. 5, 2013, 8 pages.
"Non-Final Office Action", U.S. Appl. No. 13/477,609, dated Dec. 3, 2014, 7 pages.
"Non-Final Office Action", U.S. Appl. No. 13/477,609, dated Dec. 14, 2015, 9 pages.
"Non-Final Office Action", U.S. Appl. No. 13/621,857, dated Nov. 14, 2014, 5 pages.
"Non-Final Office Action", U.S. Appl. No. 13/625,976, dated Feb. 5, 2015, 38 pages.
"Non-Final Office Action", U.S. Appl. No. 13/798,682, dated Feb. 17, 2015, 10 pages.
"Non-Final Office Action", U.S. Appl. No. 13/798,682, dated Dec. 4, 2015, 13 pages.
"Non-Final Office Action", U.S. Appl. No. 14/457,190, dated Sep. 18, 2015, 25 pages.
"Notice of Allowance", U.S. Appl. No. 13/621,857, dated Jan. 26, 2015, 7 pages.
"Notice of Allowance", U.S. Appl. No. 13/621,857, dated May 11, 2015, 5 pages.
"Notice of Allowance", U.S. Appl. No. 14/108,544, dated Oct. 15, 2015, 6 pages.
"Restriction Requirement", U.S. Appl. No. 13/621,857, dated Aug. 18, 2014, 7 pages.
"Your Choice Your Plan", GreyStone Power Corporation, http://www.greystonepower.com/UploadedFiles/pdf/prepaid%20brochure.pdf—Retrieved on Jun. 4, 2012, 2 pages.
Park,"Energy Maps for Large-scale, Mobile Wireless Networks", IEEE International Conference on Communications, 2007, Jun. 24, 2007, 6 pages.
"Final Office Action", U.S. Appl. No. 14/457,190, dated Mar. 3, 2016, 33 pages.
"Notice of Allowance", U.S. Appl. No. 13/477,609, dated Apr. 11, 2016, 5 pages.
"Notice of Allowance", U.S. Appl. No. 13/625,976, dated Mar. 3, 2016, 8 pages.
"Notice of Allowance", U.S. Appl. No. 14/451,950, dated Jan. 15, 2016, 5 pages.
"Supplemental Notice of Allowance", U.S. Appl. No. 13/625,976, dated Mar. 24, 2016, 5 pages.
"Supplemental Notice of Allowance", U.S. Appl. No. 14/451,950, dated Jan. 29, 2016, 2 pages.
"Corrected Notice of Allowance", U.S. Appl. No. 13/625,976, dated May 4, 2016, 2 pages.
"Corrected Notice of Allowance", U.S. Appl. No. 14/479,679, dated Aug. 3, 2016, 2 pages.
"Notice of Allowance", U.S. Appl. No. 13/798,682, dated Jun. 20, 2016, 10 pages.
"Notice of Allowance", U.S. Appl. No. 14/451,950, dated Apr. 22, 2016, 5 pages.
"Notice of Allowance", U.S. Appl. No. 14/479,679, dated Jun. 21, 2016, 9 pages.
"Supplemental Notice of Allowance", U.S. Appl. No. 13/477,609, dated Jun. 16, 2016, 2 pages.
"Supplemental Notice of Allowance", U.S. Appl. No. 14/451,950, dated Jun. 10, 2016, 2 pages.
"Supplemental Notice of Allowance", U.S. Appl. No. 14/451,950, dated Aug. 3, 2016, 2 pages.
"Supplemental Notice of Allowance", U.S. Appl. No. 14/457,190, dated Feb. 13, 2017, 2 pages.
"Foreign Office Action", EP Application No. 13726055.0, dated Nov. 23, 2016, 4 pages.
"Corrected Notice of Allowance", U.S. Appl. No. 14/479,679, dated Sep. 21, 2016, 2 pages.
"Corrected Notice of Allowance", U.S. Appl. No. 14/457,190, dated Nov. 14, 2016, 2 pages.
"Notice of Allowance", U.S. Appl. No. 14/457,190, dated Oct. 31, 2016, 8 pages.
Non-Final Office Action; U.S. Appl. No. 15/295,929, dated Jun. 22, 2017, 7 pages.

(56) References Cited

OTHER PUBLICATIONS

"Non-Final Office Action", U.S. Appl. No. 15/454,579, dated Sep. 6, 2017, 10 pages.
"Notice of Allowance", U.S. Appl. No. 15/295,929, dated Aug. 16, 2017, 9 pages.

* cited by examiner

STACKED ELECTROCHEMICAL CELL WITH INCREASED ENERGY DENSITY

BACKGROUND

Technical Field

This invention relates generally to electrochemical cells, and more particularly to electrochemical cell assemblies.

Background Art

The use of portable electronic devices, be they smartphones, gaming devices, or multimedia devices, is becoming a ubiquitous part of life. Users of such devices rely upon them not only for communication, but also to maintain to-do lists, surf the Internet, maintain personal and business calendars, view videos, listen to audio recordings, and to stay up-to-date with friends, family, and co-workers. Such devices are used so readily, in large part, due to their portability. Portable energy sources like rechargeable batteries eliminate the need to be continually tethered to a power outlet and allow users to take devices with them wherever they may go.

Each battery, be it rechargeable or primary, relies on an electrochemical cell for energy storage. While there may be other components in the battery pack, including circuit boards, mechanical assemblies, circuits including charging components, fuel gauging circuits, temperature measurement circuits, and indicator circuits, the primary function of the a battery is to store and release energy. Energy is stored and released by the electrochemical cell within the battery.

Each electrochemical cell includes a cathode and an anode. The two are electrically isolated by a separator. The cathode and anode offer a current path into or away from the electrochemical cell. The anode and cathode assembly are generally either wound in a "jellyroll" configuration or laminated in a stack.

There is a tension in modern electronic design between the desire to make electronic devices smaller while, at the same time, providing sufficient energy density to provide satisfactory battery "run time." Consequently, space can be limited within the housing of an electronic device to accommodate the satisfactory energy storage capacity. It would be advantageous to have a battery offering the device designer more flexibility in allocating space within an electronic device without sacrificing energy storage capacity.

Figure 1:
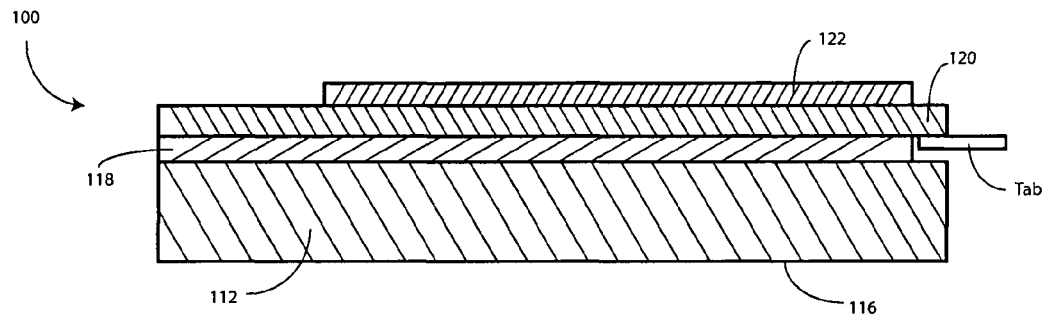
FIG. 1 illustrates a cross-sectional side view of a prior art electrode layer assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, clockwise and counterclockwise, and the like may be used solely to distinguish one entity or action from another entity or action without necessarily requiring or implying any actual such relationship or order between such entities or actions. Further, it is expected that one of ordinary skill, notwithstanding possibly significant effort and many design choices motivated by, for example, available time, current technology, and economic considerations, when guided by the concepts and principles disclosed herein will be readily capable of generating embodiments of the disclosure. Reference designators shown herein in parenthesis indicate components shown in a figure other than the one in discussion. For example, talking about a device (10) while discussing figure A would refer to an element, 10, shown in figure other than figure A.

Embodiments of the disclosure contemplate that many modern electronic devices have reduced interior volumes in which rechargeable batteries can be placed. Embodiments of the disclosure also contemplate that some electronic devices also have unique shapes, such as curved or undulating surfaces and contours. Advantageously, embodiments of the disclosure provide uniquely shaped electrochemical cell assemblies that can be used in small or uniquely shaped devices. At the same time, embodiments of the disclosure provide electrochemical cell assemblies that provide increased energy storage capacity over prior art designs.

Embodiments of the disclosure provide an electrochemical cell assembly that employs unique active material coating in its electrodes, unique winding configurations, or combinations thereof to provide electrochemical cell structures with improved energy density. In one or more embodiments, the electrochemical cell structure can be configured with unique and customizable shapes to meet the demands of uniquely shaped interior volumes of modern electronic devices.

In one embodiment, an electrochemical cell assembly includes a first cell and a second cell. The first cell and the second cell can be configured in a stacked configuration within a rechargeable battery. In one embodiment, each of the first cell and the second cell is wound in a jellyroll configuration. For example, the first cell may comprise a first anode, a first cathode, and a first separator, with each of these components wound into a jellyroll assembly. In making the jellyroll winding, in one embodiment the cathode defines an exterior of the jellyroll assembly.

A second cell can then comprise a second anode, a second cathode, and a second separator. These components can be wound into a second jellyroll configuration, with an exterior defined not by the cathode as with prior art designs, but instead with the anode. The first cell and the second cell can then be arranged in a housing with the first jellyroll assembly exterior adjacent to the second jellyroll assembly exterior (with a separator therebetween, of course). In this configuration the exterior cathode of the first jellyroll assembly can exchange ions with the exterior anode of the second jellyroll assembly, thereby providing inter-cell energy storage capacity between cells in addition to intra-cell energy storage capacity within each jellyroll. Advantageously, this structure provides increased energy storage capacity for stacked cell rechargeable batteries.

In one or more embodiments, the diameter or width of the first jellyroll assembly is different from the diameter of the second jellyroll assembly. For example, the diameter of the first jellyroll assembly may be smaller or larger than is the diameter of the second jellyroll assembly. Note that as used herein, diameter or width refers to a maximum thickness of a jellyroll assembly. Thus, were the jellyroll is elliptical in shape, the diameter or width will refer to the major diameter of the ellipse as opposed to the minor diameter. When the two jellyrolls are stacked, the different diameters or dimensions provide a stacked structure that can take on different shapes along a diameter of the overall electrochemical cell assembly. In one embodiment, each jellyroll assembly can become smaller along the diameter of the electrochemical cell assembly moving from the center to an edge by stacking additional jellyroll assemblies having smaller and smaller diameters on top of each other. In another embodiment, a groove within the electrochemical cell assembly can be defined by stacking additional jellyroll assemblies having larger and larger diameters about a center assembly. Unique shapes can be defined by varying the diameters of each jellyroll assembly. Other shapes will be obvious to those of ordinary skill in the art having the benefit of this disclosure.

Embodiments of the disclosure contemplate that market demand for uniquely shaped portable electronics is growing dramatically. Embodiments of the disclosure further contemplate that these uniquely shaped devices generally have less available interior volume in which a rechargeable battery may be stowed. Prior art attempts to provide rechargeable cells that fit into these uniquely shaped, yet smaller, volumes requires expensive and complex manufacturing techniques such as chamfering, bending, or curving cells. Application of these manufacturing techniques is limited by the internal structures of cell components that must be maintained to provide desired thermal stability requirements.

The use of varying diameter jellyroll assemblies described below, i.e., diameters that vary between adjacent cells, can be used to create any number of indentations or apertures in a stacked electrochemical cell assembly. In one or more embodiments, this causes the resulting electrochemical cell assembly to be multi-faceted. In one embodiment, the multi-faceted geometry defines at least one face having six or more sides. Advantageously, this multifaceted structure can next within the complex and undulating interior volumes of modern electronic devices. Moreover, these complex shapes can be created using ordinary jellyroll manufacturing techniques rather than the complex and expensive prior art chamfering, bending or curving processes.

Turning now to FIG. 1, illustrated therein is a cross-sectional side view of a prior art electrode layer assembly. As noted above, electrochemical cells are generally made from a positive electrode (cathode), a negative electrode (anode), and a separator that prevents these two electrodes from touching. While the separator electrically separates the cathode and anode, the separator permits ions to pass through the separator and be exchanged between the cathode and the anode.

The electrode 100 of FIG. 1 includes a separator 112 having a top and bottom 114 and 116. Disposed on the top 114 of the separator 112 is a first layer 118 of an electrochemically active material. For example, in a nickel metal hydride cell, the first layer 118 may be a layer of a metal hydride charge storage material. Alternatively, the first layer 118 may be lithium or a lithium intercalation material as is commonly employed in lithium cells.

Disposed atop first layer 118, is a current collecting layer 120. The current collecting layer may be fabricated of any of a number of metals or alloys known in the art. Examples of such metals or alloys include, for example, nickel, aluminum, copper, steel, nickel plated steel, magnesium doped aluminum, and so forth. Disposed atop the current collecting layer 120 is a second layer 122 of electrochemically active material.

The electrochemical cell stores and delivers energy by transferring ions between electrodes through a separator. For example, during discharge, an electrochemical reaction occurs between electrodes. This electrochemical reaction results in ion transfer through the separator, and causes electrons to collect at the negative terminal of the cell. When connected to a load, such as an electronic device, the electrons flow from the negative pole through the circuitry in the load to the positive terminal of the cell. This is shown in circuit diagrams as current flowing from the cathode to the anode.

When the electrochemical cell is charged, the opposite process occurs. Thus, to power electronic devices, these electrons must be delivered from the cell to the electronic device. This is generally accomplished by coupling conductors, such as conductive foil strips, sometimes referred to colloquially as "electrical tabs" to the various layers. Such tabs are shown in FIG. 2.

Figure 2:
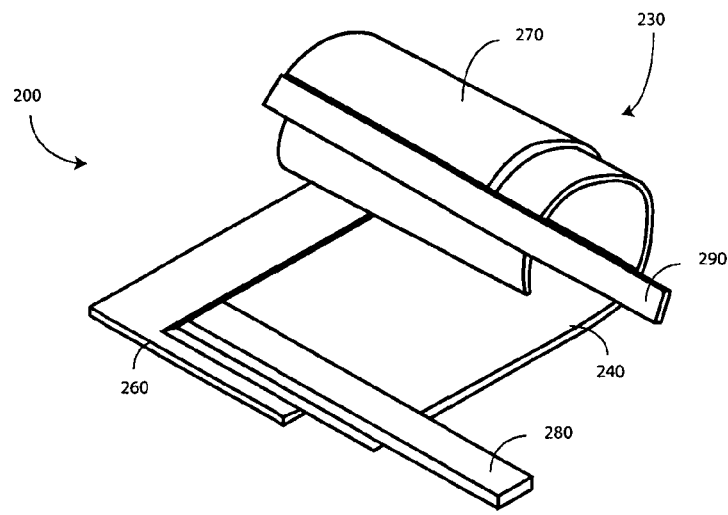
FIG. 2 illustrates a prior art stack of electrodes assembled in the jellyroll configuration.

Referring now to FIG. 2, illustrated therein is stack of prior art electrodes like that in FIG. 1 assembled in the jellyroll assembly 200 for use in a rechargeable cell. In FIG. 2, two electrodes 240 and 260 are provided as described above. Electrode 240 is fabricated with one or more layers of active electrode material, as is electrode 260. In prior art designs, electrode 260 is the cathode and electrode 240 is the anode. As shown, electrode 240 is fabricated with electrochemically active negative electrode material while electrode 260 is fabricated with a layer of electrochemically active positive electrode material. Thus, when the electrodes 240,260 are wound in to the jellyroll assembly 200, the cathode defines an exterior 230 of the jellyroll assembly 200.

A first tab 280 is coupled to one electrode 240, while a second tab 290 is coupled to another electrode 260. These tabs 280,290 can be coupled to the current collectors of each electrode 240,260.

The electrodes 240 and 260 are arranged in stacked relationship, with the tabs 280,290 being disposed on opposite edges of the stack. Thereafter, the stack is rolled into a roll 270, sometimes referred to as a jellyroll, for a subsequent insertion into an electrochemical cell housing. The housing can be a metal can or a flexible pouch. Where metal, the housings are generally oval, but can also be rectangular, or circular in cross section as well. The housings have an opening that is sealed when the roll 270 is inserted.

Figure 3:
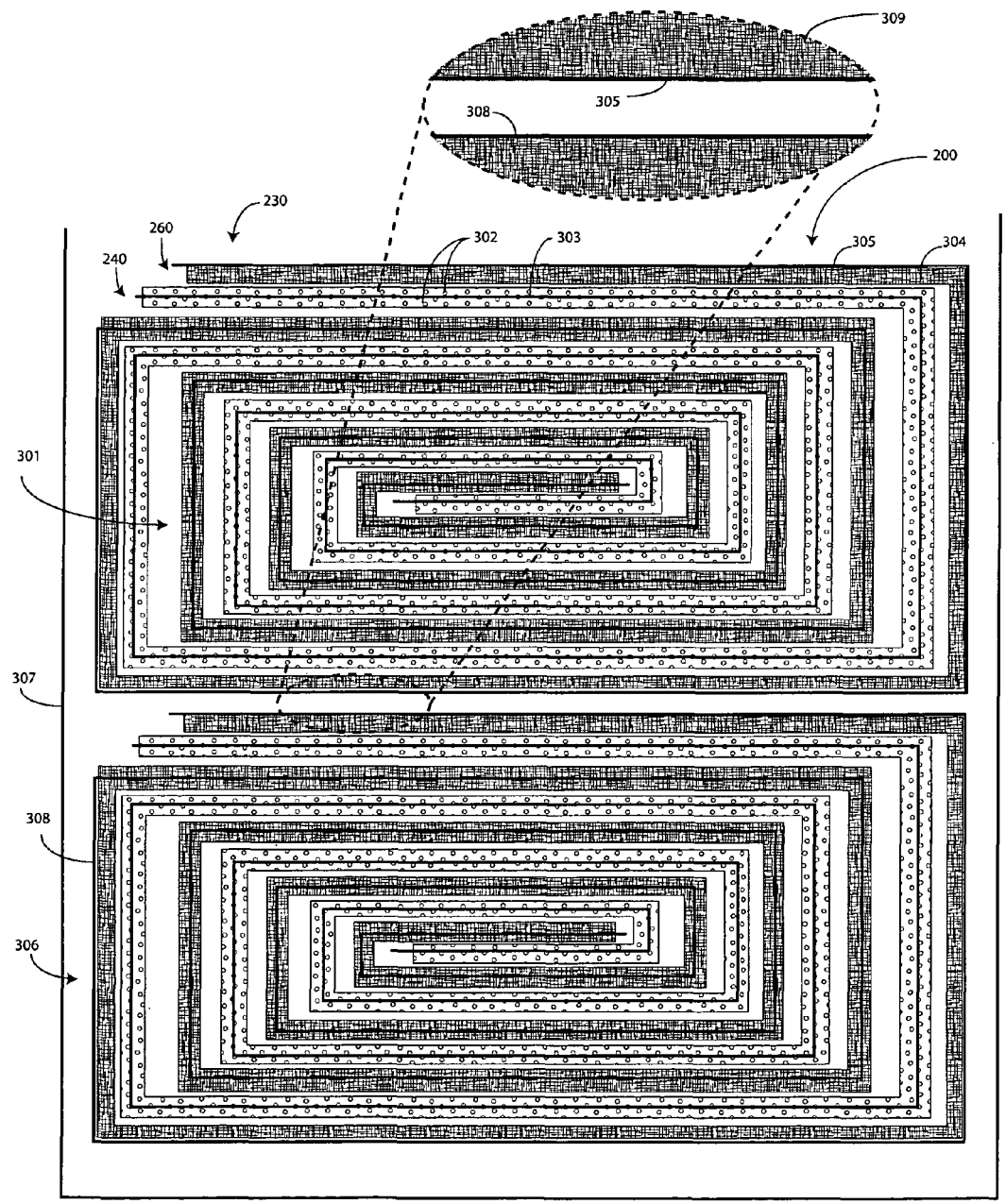
FIG. 3 illustrates a prior art electrode assembly.

As shown in FIG. 2, when the electrodes 240,260 are rolled, tab 290 will end up substantially in the center of the roll 270, while tab 280 will end up generally on the periphery of the roll 270. When the roll 270 is placed in a housing, as shown in FIG. 3, that tab 290 will be centrally disposed within the housing. Tab 280 will be disposed peripherally within the housing.

Turning now to FIG. 3, illustrated therein is a sectional view of the prior art jellyroll assembly 200 described above with reference to FIG. 2. As noted above, electrode 260 is the cathode and electrode 240 is the anode. Thus, when the electrodes 240,260 are wound in to the jellyroll assembly 200, the cathode defines an exterior 230 of the jellyroll assembly 200.

As shown in FIG. 3, in the interior portions 301 of the jellyroll assembly 200, electrochemically active material 302 is disposed on both sides of the current collecting layer 303 of the anode. Similarly, electrochemically active material 304 is disposed on both sides of the current collecting layer 305 of the cathode. However, at the exterior 230 of the jellyroll assembly 200, the electrochemically active material 304 of the cathode is disposed only on one side of the current collecting layer 305. Thus, while the cathode defines an exterior 230 of the jellyroll assembly 200, it is actually the current collecting layer 305 of the cathode that defines the exterior 230 of the jellyroll assembly 200.

When the jellyroll assembly 200 is stacked with another jellyroll assembly 306 in a housing 307, the current collecting layer 305 of the cathode of the first jellyroll assembly 200 is disposed adjacent to the current collecting layer 308 of the cathode of the second jellyroll assembly 306. This is shown in exploded view 309, where current collecting layer 305 is adjacent to current collecting layer 308. A separator (not shown) would be placed between current collecting layer 305 and current collecting layer 308 to prevent these layers from shorting.

Figure 4:
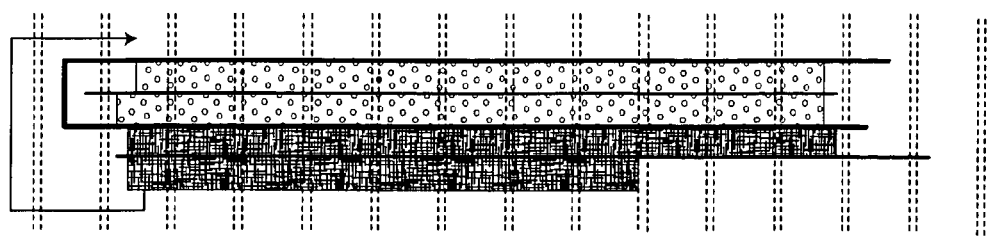
FIG. 4 illustrates a method of manufacturing a prior art electrode assembly.

Turning to FIG. 4, illustrated therein is a manufacturing process 400 to create the jellyroll assembly (200) of FIGS. 2-3. As shown in FIG. 4, the anode is formed by disposing electrochemically active material 302 on two sides of the current collecting layer 303. A separator 401 is then wrapped about the anode.

To construct the cathode, electrochemically active material 304 is disposed about another current collecting layer 305. However, the electrochemically active material 304 is omitted 402 at the right side (as viewed in FIG. 4) of the cathode. The resulting assembly is then wound 404 in a clockwise direction for a number of turns 403. Toward the end of the winding, the omission 402 results in the current collecting layer 305 of the cathode defining the exterior (230) of the resulting jellyroll assembly (200).

Figure 5:
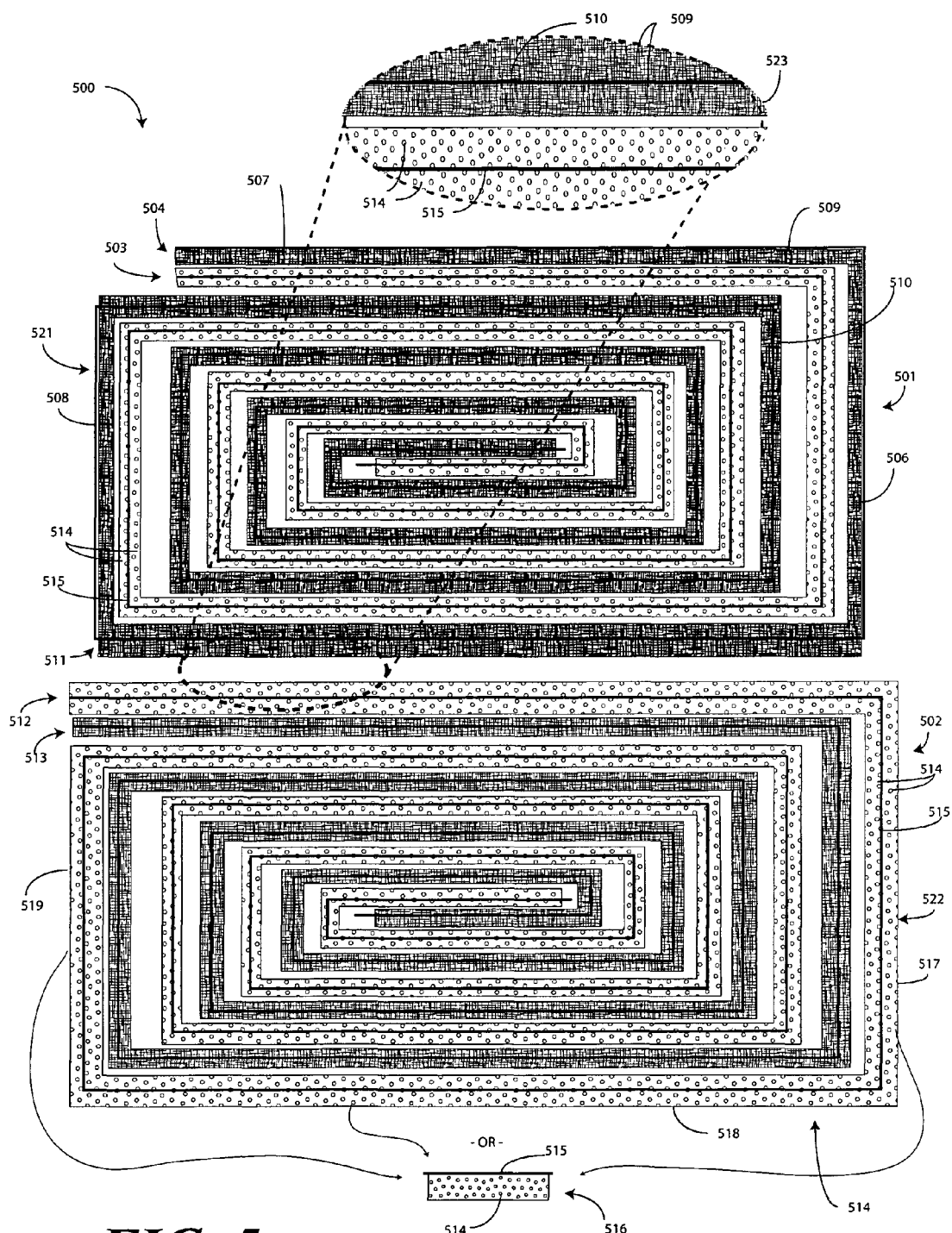
FIG. 5 illustrates one explanatory electrochemical cell assembly in accordance with one or more embodiments of the disclosure.

Turning now to FIG. 5, illustrated therein is an electrochemical cell assembly 500 configured in accordance with one or more embodiments of the disclosure. The electrochemical cell assembly 500 includes a first cell, represented by jellyroll assembly 501, and a second cell, represented by jellyroll assembly 502. The first cell and the second cell are arranged in a stacked configuration in FIG. 5. A separator (not shown) is disposed between the first cell and the second cell.

The first cell includes a first anode 503 and a first cathode 504. The first anode 503 and the first cathode 504 are wound to form the first jellyroll assembly 501. The first cathode 504 defines an exterior 505 of the first jellyroll assembly 501. While shown as rectangular in cross section for illustration purposes, in practice the first jellyroll assembly 501 can be circular, ovular, or other shapes in cross section.

In the interior of the first jellyroll assembly 501, the first cathode 504 includes electrochemically active material 509 disposed on both sides of a current collecting layer 510. On sides 506,507,508 not adjacent to the second cell, the first cathode 504 includes electrochemically active material 509 disposed only on one side of the current collecting layer 510. In this illustrative embodiment, the electrochemically active material 509 is disposed on an interior of the current collecting layer 510 along these sides 506,507,508. However, at the side 511 adjacent to the second cell, the electrochemically active material 509 is disposed on both sides of the current collecting layer 510. Thus, the exterior 521 of the first jellyroll assembly 501 is defined by the first cathode 504, with a side 511 of the first jellyroll assembly 501 adjacent to the second cell defined by electrochemically active material 509 of the first cathode 504.

Meanwhile, the second jellyroll assembly 502 has a completely different configuration. As with the first cell, the second cell includes a second anode 512 and a second cathode 513. The second anode 512 and the second cathode 513 are wound to form the second jellyroll assembly 502. Rather than the second cathode 513 defining the exterior 514 of the second jellyroll assembly 502, in one or more embodiments the second anode 512 defines the exterior 514 of the second jellyroll assembly 502. As with the first jellyroll assembly 501, while the second jellyroll assembly 502 is shown being rectangular in cross section for illustration purposes, in practice the second jellyroll assembly 502 can be circular, ovular, or other shapes in cross section.

In one embodiment, the second anode 512 of the second jellyroll assembly 502 has electrochemically active material 514 disposed on both sides of the current collecting layer 515. In another embodiment, as represented by portion 516, the electrochemically active material 514 can be disposed on only one side of the current collecting layer 515 along sides 517,518,519 not adjacent to the first cell. However, along the side 520 adjacent to the first cell, the electrochemically active material 514 is disposed along both sides of the current collecting layer 515. Thus, the exterior 522 of the second jellyroll assembly 502 is defined by the second anode 512, with a side 520 of the second jellyroll assembly 502 adjacent to the first cell defined by electrochemically active material 514 of the second anode 512.

This "cathode to anode" abutment is shown in exploded view 523. Electrochemically active material 509 of the first cathode 504 is shown exterior to the current collecting layer 510 of the first cathode 504. Similarly, electrochemically active material 514 of the second anode 512 is shown exterior to the current collecting layer 515 of the second anode 512. With a separator disposed therebetween, the first cathode 504 of the first jellyroll assembly 501 and the second anode 512 of the second jellyroll assembly 502 can exchange ions to provide an "additional wrap" of an equivalent jellyroll assembly to, advantageously, increase the energy storage capacity of the overall electrochemical cell assembly 500.

In one embodiment, the side 520 of the second jellyroll assembly 502 facing, or adjacent to, the first cell is greater in width than is the side 511 of the first jellyroll assembly 501 facing, or adjacent to, the second cell. Said differently, in one embodiment the electrochemically active material 514 disposed along an area of the second jellyroll assembly (502), and the area is greater than the portion defined by the electrochemically active material 509 of the first cathode 504. In one or more embodiments, as illustrated by portion (516), the area can comprise an entirety of the second jellyroll assembly exterior.

This is done to provide electrochemically active material 514 of the second anode 512 along the side 520 of the second jellyroll assembly 502 that extends beyond (to the left and right as viewed in FIG. 5) the electrochemically active material 509 of the first cathode 504 along the side 511 of the first jellyroll assembly 501. Embodiments of the disclosure contemplate that where electrochemically active material 509 of the first cathode 504 is exposed without being covered by adjacent electrochemically active material 514 of the second anode 512, the active elements of the electrochemically active material 509 of the first cathode 504 can leach into the surrounding electrolyte. For example, where the first jellyroll assembly 501 includes a lithium-based cathode, the electrochemically active material 509 of the cathode 504 may include lithium or a lithium intercalation material. If this material leaches into the surrounding electrolyte, it can plate in undesirable locations to compromise reliability and performance of the resulting battery. For this reason, in one or more embodiments the side 520 of the second jellyroll assembly 502 facing, or adjacent to, the first cell is sufficiently large as to ensure that none of the electrochemically active material 509 of the first cathode 504 is exposed without corresponding electrochemically active material 514 of the second anode 512 material directly adjacent.

Figure 6:
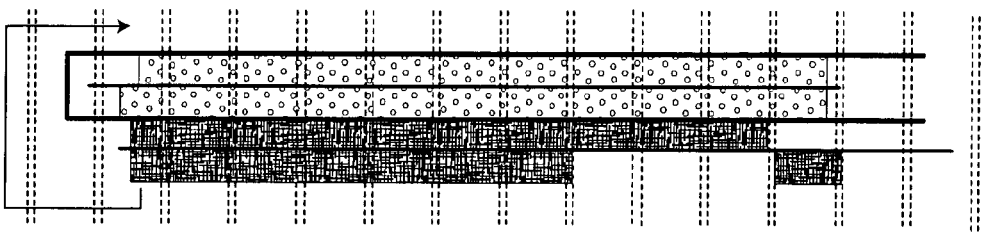
FIG. 6 illustrates an explanatory method of manufacturing an electrode assembly in accordance with one or more embodiments of the disclosure.

Turning now to FIG. 6, illustrated therein is a method 600 of manufacturing the first jellyroll assembly (501) shown in FIG. 5. In this method, the electrochemically active material 509 of the first cathode 504 is selectively disposed along a portion of the current collecting layer 510 at the first jellyroll assembly exterior. As described above with reference to FIG. 5, in one embodiment, the portion comprises only where the first jellyroll assembly exterior is adjacent to the second jellyroll assembly exterior as shown in exploded view (523).

As shown in FIG. 6, the first anode 505 is formed by disposing electrochemically active material 601 on two sides of the current collecting layer 602. A separator 603 is then wrapped about the electrochemically active material 601 of the first anode 503.

To construct the first cathode 504, electrochemically active material 509 is disposed about another current collecting layer 510. However, the electrochemically active material 509 is omitted 604 along a portion of the current collecting layer 510. After the omission 604, an additional segment 605 of the electrochemically active material 509 is disposed along the current collecting layer 510. Thus, there is a gap of non-placement of the electrochemically active material 509 defined by the omission 604 between the initial segment 606 of the electrochemically active material 509 disposed along an exterior side of the current collecting layer 610 and the additional segment 605 of the electrochemically active material 509.

The resulting assembly is then wound 607 in a clockwise direction for a number of turns 608. Toward the end of the winding, the omission 604, combined with the additional segment 605 of electrochemically active material 509, results in the side (511) of the first jellyroll assembly (501) adjacent to the second cell of FIG. 5 including the electrochemically active material 509 disposed on both sides of the current collecting layer 510. By contrast, the electrochemically active material 509 is disposed only on an interior of the current collecting layer 510 along the other sides (506, 507, 508) of the first jellyroll assembly (501).

Figure 7:
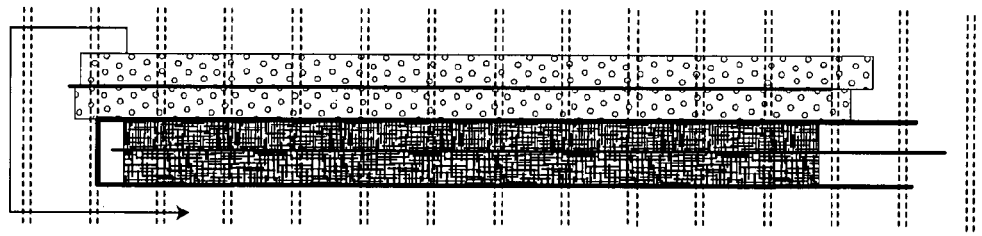
FIG. 7 illustrates another method of manufacturing an electrode assembly in accordance with one or more embodiments of the disclosure.

Turning now to FIG. 7, illustrated therein is a method 700 for manufacturing the second jellyroll assembly (502) of FIG. 5. As shown in FIG. 7, the second anode 512 is formed by disposing electrochemically active material 514 on two sides of the current collecting layer 515. A separator 701 is then wrapped about the second anode 512. It should be noted that the separator 701 could also be wrapped about the second cathode 511 as well.

To construct the second cathode 511, electrochemically active material 702 is disposed about another current collecting layer 305. The resulting assembly is then wound 704 not in a clockwise direction as in the prior art, but instead in a counterclockwise direction so that the second anode 512 defines an exterior of the second jellyroll assembly (502).

It was noted above that in the electrochemical cell assembly (500) of FIG. 5, a separator was placed between the first jellyroll assembly (501) and the second jellyroll assembly (502) to permit ion exchange between the electrochemically active material (509) of the first cathode (504) and the electrochemically active material 514 of the second anode 512. This separator can take any of a variety of forms. In one embodiment, the separator between the first jellyroll assembly (501) and the second jellyroll assembly (502) comprises an extension of separator (603) that is placed between the first jellyroll assembly (501) and the second jellyroll assembly (502). In another embodiment, this separator between the first jellyroll assembly (501) and the second jellyroll assembly (502) is an extension of separator 701 that is placed between the first jellyroll assembly (501) and the second jellyroll assembly (502). Where the separator between the first jellyroll assembly (501) and the second jellyroll assembly (502) is an extension of either separator (603) or separator 701, the extension can be long enough in one embodiment to completely wrap around an opposite jellyroll assembly to provide increased mechanical stability during packaging. In yet another embodiment, this separator is a third separator that is placed between the first jellyroll assembly (501) and the second jellyroll assembly (502). Other configurations will be obvious to those of ordinary skill in the art having the benefit of this disclosure.

Where a third separator is used, in one embodiment the third separator is manufactured from a pure polymer-based material. In one embodiment, the polymer-based material has a higher melting point than either separator (603) or separator 701. In another embodiment where a third separator is used, the third separator is manufactured from a material comprising a pure ceramic base. In one embodiment, the ceramic base separator is manufactured with an appropriate ionic and higher thermal conductivity than separator (603) or separator 701, but with a similar electrical insulating property. In yet another embodiment where a third separator is used, the third separator is manufactured from a mixture of a polymer-based and ceramic-based material. In one embodiment, this mixed-base material has an appropriate ionic and higher thermal conductivity that separator (603) or separator 701, but with a similar electrical insulating property.

A comparison of FIGS. 6 and 7 indicates that jellyroll assemblies configured in accordance with embodiments of the disclosure can be wound in opposite directions. For example, the assembly in FIG. 6. is wound clockwise, while the assembly in FIG. 7 is wound counterclockwise.

Figure 8:
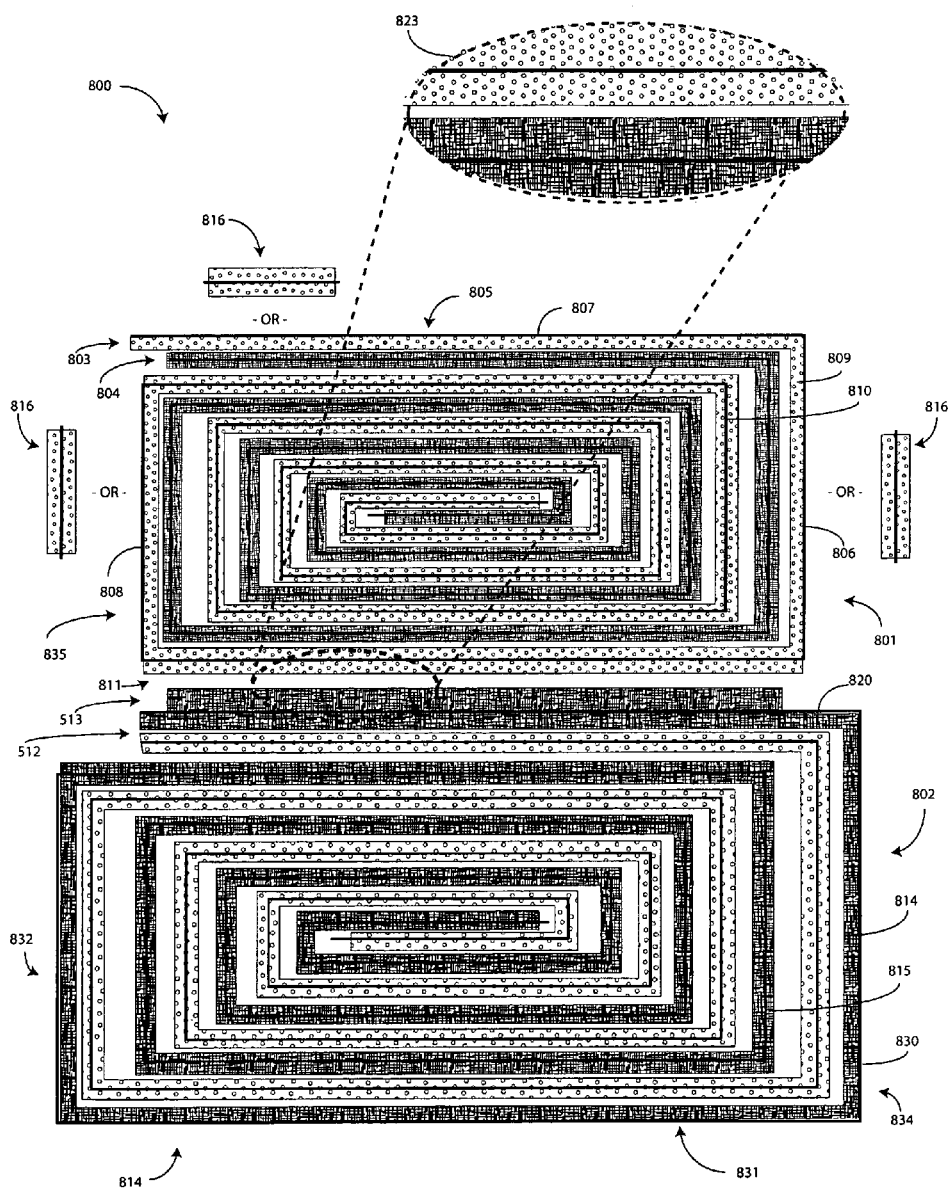
FIG. 8 illustrates another explanatory electrochemical cell assembly in accordance with one or more embodiments of the disclosure.

Turning now to FIG. 8, illustrated therein is another electrochemical cell assembly 800 configured in accordance with one or more embodiments of the disclosure. The electrochemical cell assembly 800 includes a first cell, represented by jellyroll assembly 801, and a second cell, represented by jellyroll assembly 802. The first cell and the second cell are arranged in a stacked configuration in FIG. 8. A separator (not shown) is disposed between the first cell and the second cell. The separator could be any of the separator configurations described in the preceding paragraph.

The first cell includes a first anode 803 and a first cathode 804. The first anode 803 and the first cathode 804 are wound to form the first jellyroll assembly 801. The first anode 803 defines an exterior 805 of the first jellyroll assembly 801. While shown as rectangular in cross section for illustration purposes, in practice the first jellyroll assembly 801 can be circular, ovular, or other shapes in cross section.

In the interior of the first jellyroll assembly 801, the first anode 803 includes electrochemically active material 809 disposed on both sides of a current collecting layer 810. On sides 806,807,808 not adjacent to the second cell, the first anode 803 can be configured in one of several ways. In a first embodiment, the first anode 803 includes electrochemically active material 809 disposed only on one side of the current collecting layer 810. In another embodiment, as represented by portions 816, the electrochemically active material 809 disposed on both sides of the current collecting layer 810. In still other embodiments, some sides 806,807,808 may have electrochemically active material 809 disposed only on one side of the current collecting layer 810, while other sides 806,807,808 have the electrochemically active material 809 disposed on both sides of the current collecting layer 810.

Regardless of which configuration the sides 806,807,808 not adjacent to the second cell take, in one embodiment, along the side 811 adjacent to the second cell, the electrochemically active material 809 is disposed along both sides of the current collecting layer 810. Thus, the exterior 805 of the first jellyroll assembly 801 is defined by the first anode 803, with a side 811 of the first jellyroll assembly 801 adjacent to the second cell defined by electrochemically active material 809 of the first anode 803.

Meanwhile, the second jellyroll assembly 802 has a completely different configuration that is much the same as was the first jellyroll assembly (501) of FIG. 5 above. As with the first cell, the second cell includes a second anode 812 and a second cathode 813. The second anode 812 and the second cathode 813 are wound to form the second jellyroll assembly 802. Rather than the second anode 812 defining the exterior 814 of the second jellyroll assembly 802, in one or more embodiments the second anode 812 defines the exterior 814 of the second jellyroll assembly 802. As with the first jellyroll assembly 801, while the second jellyroll assembly 802 is shown being rectangular in cross section for illustration purposes, in practice the second jellyroll assembly 802 can be circular, ovular, or other shapes in cross section.

In the interior of the second jellyroll assembly 802, the second cathode 813 includes electrochemically active material 814 disposed on both sides of a current collecting layer 815. On sides 831,832,833 not adjacent to the first cell, the second cathode 813 includes electrochemically active material 814 disposed only on one side of the current collecting layer 815. In this illustrative embodiment, the electrochemically active material 814 is disposed on an interior of the current collecting layer 815 along these sides 831,832,833. However, at the side 820 adjacent to the first cell, the electrochemically active material 814 is disposed on both sides of the current collecting layer 815. Thus, the exterior 814 of the second jellyroll assembly 802 is defined by the second cathode 813, with a side 820 of the second jellyroll assembly 802 adjacent to the first cell defined by electrochemically active material 814 of the second cathode 813.

In the illustrative embodiment of FIG. 8, the first jellyroll assembly 801 has a first width 835, while the second jellyroll assembly 802 has a second width 834. In this embodiment, the second width 834 is greater than the first width 835. However, in another embodiment, the second width 834 could be less than the first width 835. Regardless of which embodiment is used, as with the embodiment of FIG. 5, the electrochemical cell assembly 800 of FIG. 8 has anode electrochemically active material that spans the exteriorly exposed cathode electrochemically active material. Said differently, in one embodiment, despite having a lesser width, the side 811 of the first jellyroll assembly 801 facing, or adjacent to, the second cell is still greater in width than is the side 820 of the second jellyroll assembly 802 facing, or adjacent to, the first cell. This is done to provide electrochemically active material 809 of the first anode 803 along the side 811 of the first jellyroll assembly 801 that extends beyond (to the left and right as viewed in FIG. 8) the electrochemically active material 814 of the second cathode 813 along the side 820 of the second jellyroll assembly 802. This is done to ensure that none of the electrochemically active material 814 of the second cathode 813 is exposed to permit leaching of lithium materials into the surrounding electrolyte. The "anode to cathode" abutment is shown in exploded view 823.

Thus, as shown in FIG. 8, the first anode 803 comprises electrochemically active material 809 disposed on an area of the first jellyroll assembly exterior. Similarly, the second cathode 813 comprises another electrochemically active material 814 that is selectively disposed on only a portion of the second jellyroll assembly exterior. In this illustrative embodiment, the area is greater than the portion, as described in the preceding paragraph. In this illustrative embodiment, the portion comprises only where the first jellyroll assembly exterior is adjacent to the second jellyroll assembly exterior, and thus comprises less than an entirety of the first jellyroll assembly exterior. However, as shown in portions 816, the portion can comprise the entirety of the first jellyroll assembly exterior due to the fact that the electrochemically active material 814 is anode material and not cathode material that can potentially leach into the surrounding electrolyte. Note that the first jellyroll assembly 801 and the second jellyroll assembly 802 can be separated by a separator as previously described.

Figure 9:
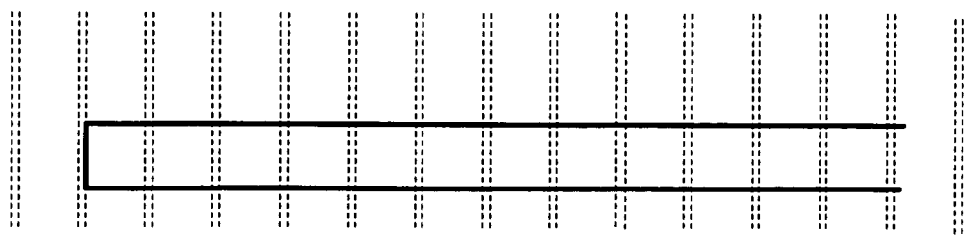
FIG. 9 illustrates yet another method of manufacturing an electrode assembly in accordance with one or more embodiments of the disclosure.

The manufacturing process to create the second jellyroll assembly 802 is substantially similar to the method (600) shown in FIG. 6. Turning now to FIG. 9, illustrated therein is a method 900 for manufacturing the first jellyroll assembly (801) of FIG. 8.

As shown in FIG. 9, the first cathode 804 can be formed, in one embodiment, by disposing electrochemically active material 901 on two sides of the current collecting layer 902. A separator 903 is then wrapped about the electrochemically active material 901 of the first cathode 804.

To construct the first anode 803, electrochemically active material 809 is disposed about another current collecting layer 810. However, the electrochemically active material 809 is omitted 904 along a portion of the current collecting layer 810. After the omission 904, an additional segment 905 of the electrochemically active material 809 is disposed along the current collecting layer 810. Thus, there is a gap of non-placement of the electrochemically active material 809 defined by the omission 904 between the initial segment 906 of the electrochemically active material 809 disposed along an exterior side of the current collecting layer 810 and the additional segment 905 of the electrochemically active material 809.

The resulting assembly is then wound 907 in a counter-clockwise direction for a number of turns 908. Toward the end of the winding, the omission 904, combined with the additional segment 905 of electrochemically active material 809, results in the side (811) of the first jellyroll assembly (801) adjacent to the second cell of FIG. 8 including the electrochemically active material 809 disposed on both sides of the current collecting layer 810.

Figure 10:
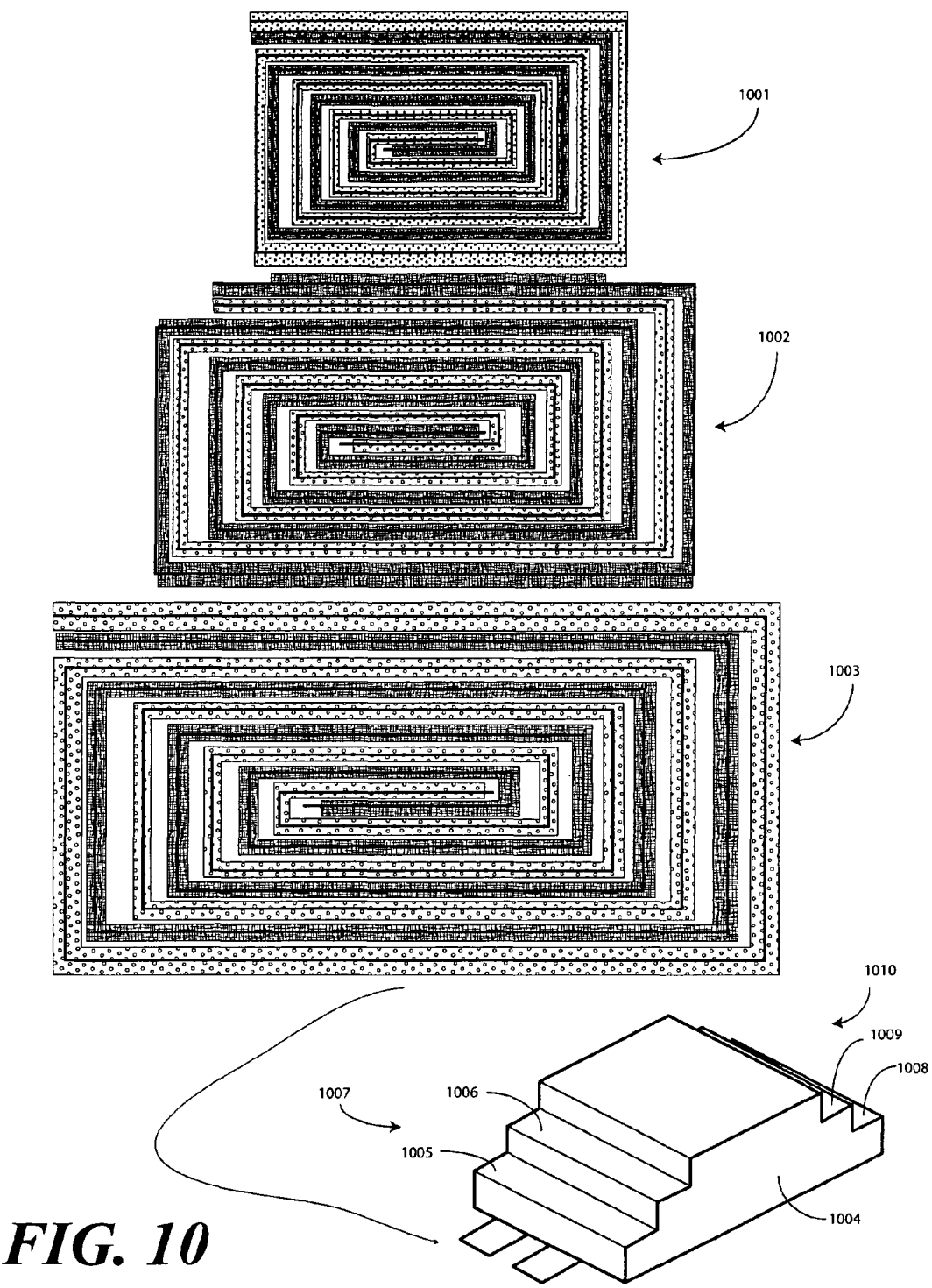
FIG. 10 illustrates yet another explanatory electrochemical cell assembly configured in accordance with one or more embodiments.

To show how embodiments of the disclosure can be expanded, FIG. 10 illustrates three jellyroll assemblies 1001,1002,1003 stacked together. Embodiments of the disclosure can include stacks and rows of any number of jellyroll assemblies. Moreover, the width of each adjacent jellyroll assembly can vary from cell to cell.

The three jellyroll assemblies 1001,1002,1003 are stacked together in FIG. 10 with each jellyroll having a smaller width along a vertical axis as viewed in FIG. 10. Thus, jellyroll assembly 1003 has the greatest width, while jellyroll assembly 1002 has a lesser width. Jellyroll assembly 1001 has the least width of all. This results in a cell structure shown at electrochemical cell 1004.

As shown at electrochemical cell 1004, when the three jellyroll assemblies 1001,1002,1003 are stacked in this configuration, the resulting electrochemical cell 1004 defines a multi-faceted geometry. In this illustrative embodiment, the electrochemical cell 1004 defines a dual-stair-stepped structure having two steps 1005,1006 disposed along a first side 1007 of the electrochemical cell 1004 and two steps 1008,1009 disposed along a second side 1010 of the electrochemical cell 1004. In this embodiment, the first side 1007 and the second side 1008 of the electrochemical cell 1004 are opposite each other due to the fact that the widths of each jellyroll assembly 1001,1002,1003 gets smaller along the vertical axis. Other shapes will be obvious to those of ordinary skill in the art having the benefit of this disclosure.

Figure 11:
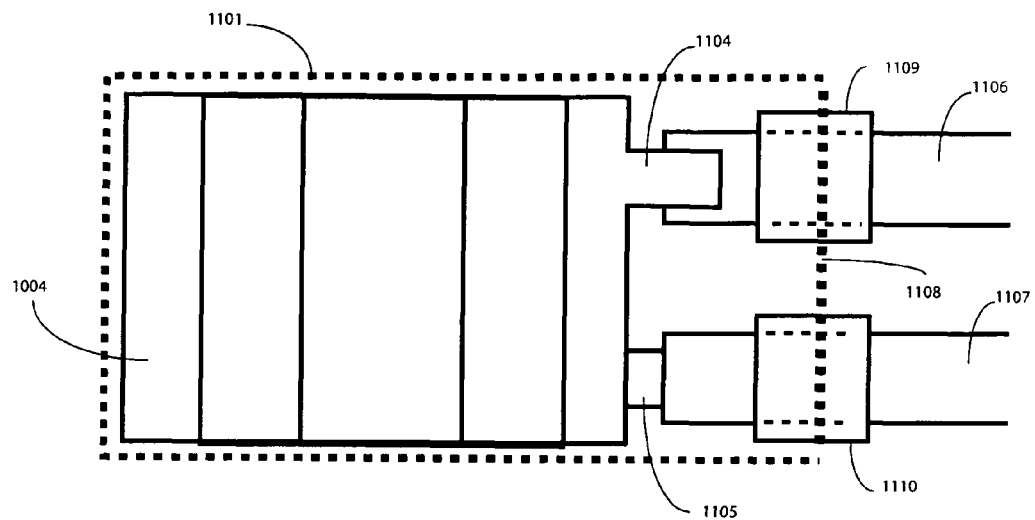
FIG. 11 illustrates one explanatory electrochemical cell configured in accordance with one or more embodiments.

Turning to FIG. 11, the electrochemical cell 1004 has been inserted into a housing 1101. The housing 1101 can comprise a rigid housing, such as a metal can, or optionally can be flexible, such as a synthetic pouch. In one embodiment, the housing 1101 is a laminated polymer package. Metallic layers in such laminated packaging are insulated from the anodes and cathodes of the electrochemical cell.

The tabs 1104,1105 couple to each anode and cathode of electrochemical cell 1004. The tabs 1104,1105, which are constructed from metal foil in this explanatory embodiment, are joined to an external tab 1106,1107. The external tabs 1106,1107 provide electrical conductivity to external components.

When the electrochemical cell 1004 is placed into the housing 1101, an opening 1108 of the housing 1101 is then sealed about the external tabs 1106,1107. A tight seal may be required about the external tabs 1106,1107 to prevent any electrolyte from escaping the housing 1101. The tight seal also prevents dust, moisture, and debris from entering the cell.

To ensure a tight seal, with no space or pockets on the sides of the external tabs 1106,1107, plastic sealing members 1109,1110 are placed about the external tabs 1106,1107. The housing 1101 is then sealed about the plastic sealing members 1109,1110.

Figure 12:
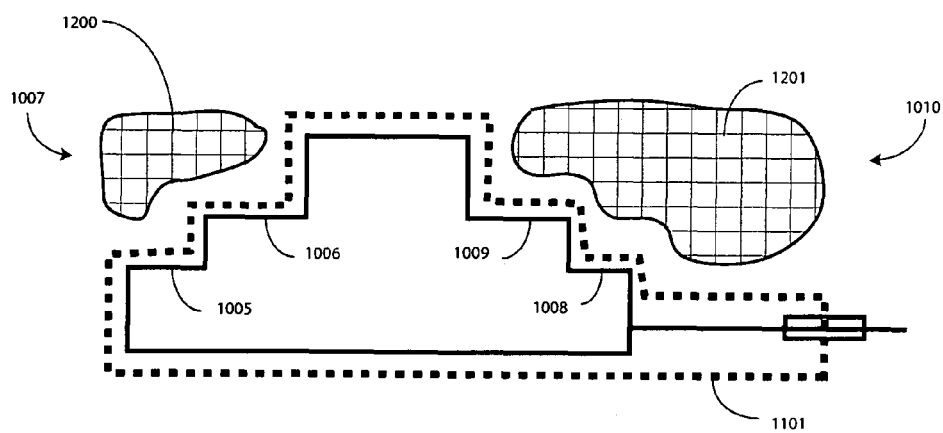
FIG. 12 illustrates an explanatory electronic assembly configured in accordance with one or more embodiments.

Turning to FIG. 12, a side view of the completed assembly 1200 is shown. The dual-stair-stepped structure having two steps 1005,1006 disposed along a first side 1007 of the electrochemical cell assembly 1004 and two steps 1008, 1009 disposed along a second side 1010 of the electrochemical cell assembly 1004 allow circuit or other components 1201,1202 to be placed within the voids defined by the stair steps. Note that the components 1201,1202 could be placed within the housing 1101 in one embodiment. In another embodiment, where the housing 1101 is configured as a pouch, the pouch can be vacuum-sealed about the electrochemical cell assembly 1004 so that the components 1201, 1202 can be placed against the assembly 1200. As is understood from the view of FIG. 12, the voids defined by the stair steps provide additional space within an electronic device in which components can be disposed. Alternatively, the voids defined by the stair steps can allow the assembly to be disposed in areas within an electronic device in which a prior art rectangular cell would not fit. Illustrating by example, the assembly 1200 may be configured to fit within a corner of a mobile phone, laptop computer, tablet computer, portable media, digital camera, and/or PDA.

Figure 13:
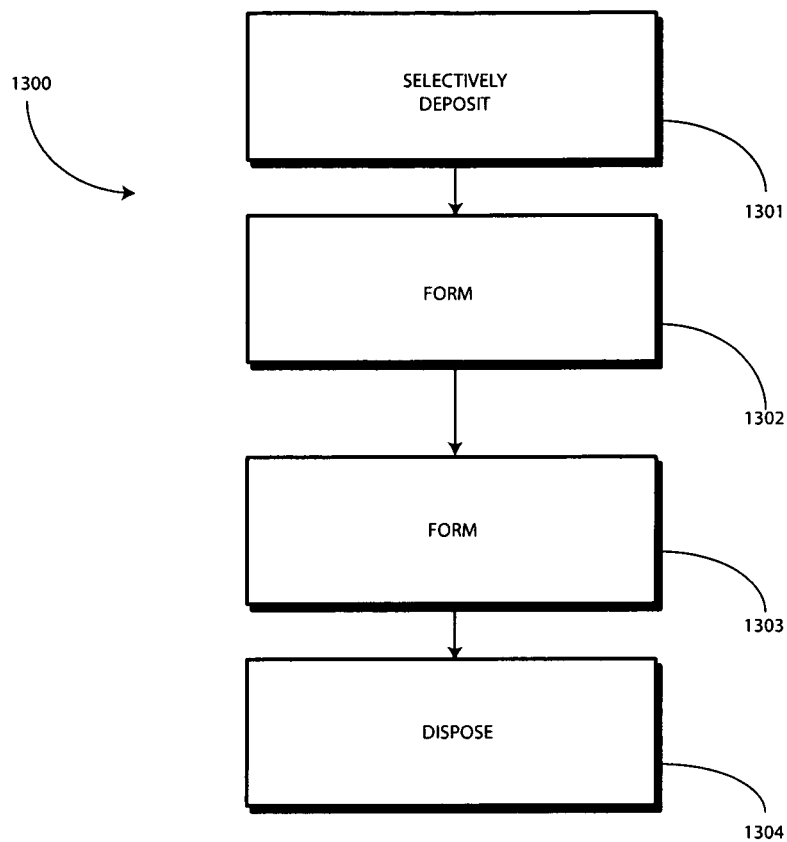
FIG. 13 illustrates an explanatory method in accordance with one or more embodiments of the disclosure.

Turning now to FIG. 13, illustrated therein is a method 1300 for manufacturing an electrochemical cell assembly configured in accordance with one or more embodiments of the disclosure. At step 1301, the method 1300 includes selectively depositing an electrochemically active material on a current collection layer to obtain a first cathode. At step 1302, the method includes forming, from the first cathode, a first anode, and a first separator, a first jellyroll assembly. In one embodiment, the first jellyroll assembly includes a first exterior defined by the first cathode, with the electrochemically active material deposited only on a portion of the first exterior.

At step 1303, the method 1300 includes forming, from a second cathode, a second anode, and a second separator, a second jellyroll assembly. In one embodiment, the second jellyroll assembly has a second exterior defined by the second anode. In one embodiment, step 1303 includes selectively depositing another electrochemically active material to obtain the second anode. In one embodiment, the another electrochemically active material is deposited along an area greater than that upon which the electrochemically active material of step 1301 is deposited.

At step 1304, the method includes disposing the first jellyroll assembly and the second jellyroll assembly in a housing with the portion of the first exterior adjacent to the second exterior. In one embodiment one of the first jellyroll assembly or the second jellyroll assembly has a width that is less than another of the first jellyroll assembly or the second jellyroll assembly. Accordingly, in one embodiment the width of the first jellyroll assembly is less than the width of the second jellyroll assembly. In another embodiment, the width of the first jellyroll assembly is greater than the width of the second jellyroll assembly.

As described above, embodiments of the disclosure can provide an electrochemical cell assembly having a stepped construction. The stepped construction can include a first jellyroll assembly adjacent to (but separated by a separator from) a second jellyroll assembly. Simply stated, the first jellyroll assembly can include an "outer wrap" made of cathode material, while the second jellyroll assembly has an outer wrap made of anode material. This counterintuitive approach (compared to the prior art) provides a more efficient cell structure with higher volumetric energy density. Moreover, as jellyroll assemblies can be used to create electrochemical cell structures with unique shapes, embodiments of the disclosure are easier to build, as chamfering, bending, and other expensive methods are no longer required.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electrochemical cell assembly, comprising:
a first cell; and
a second cell;
the first cell having a first width, the first cell comprising a first anode and a first cathode wound in a first jellyroll assembly with a first jellyroll assembly exterior defined by the first cathode, a portion of the first cathode extending along one or more turns of the first jellyroll assembly;
the second cell having a second width being greater than the first width, the second cell comprising a second anode and a second cathode, wound in a second jellyroll assembly with a second jellyroll assembly exterior defined by the second anode; and
the first cell and the second cell arranged in a housing with the first jellyroll assembly exterior adjacent to the second jellyroll assembly exterior such that the second anode includes an anode area of electrochemically active material on the second jellyroll assembly exterior that is greater than a cathode area of the first cathode on the first jellyroll assembly exterior at a cathode to anode abutment.

2. The electrochemical cell assembly of claim 1, wherein:
the first anode and the first cathode are separated by a first separator;
the second anode and the second cathode are separated by a second separator; and
the first jellyroll assembly exterior and the second jellyroll assembly exterior are separated by one of a portion of the first separator or a portion of the second separator.

3. The electrochemical cell assembly of claim 1, wherein the first jellyroll assembly is wound in one of a clockwise direction or a counter-clockwise direction and the second jellyroll assembly is wound in the other of the clockwise direction or the counter-clockwise direction.

4. The electrochemical cell assembly of claim 1, wherein the first cell and the second cell are arranged to permit ion exchange between the first cathode and the second anode.

5. The electrochemical cell assembly of claim 1, wherein:
the first cathode comprises an additional electrochemically active material disposed along a first side of a current collecting layer;
the additional electrochemically active material is selectively disposed along a first portion of a second side of the current collecting layer; and
the first jellyroll assembly exterior is defined by:
the additional electrochemically active material of the first cathode along the first portion of the second side of the current collecting layer; and
a second portion of the second side of the current collecting layer of the first cathode that is outside of the first portion of the second side of the current collecting layer.

6. The electrochemical cell assembly of claim 5, wherein the additional electrochemically active material is disposed on both sides of the current collecting layer along turns of the first jellyroll assembly interior to the first jellyroll assembly exterior.

7. The electrochemical cell assembly of claim 5, wherein the first portion of the second side of the current collecting layer is only at the cathode to anode abutment.

8. The electrochemical cell assembly of claim 7, wherein the second anode comprises the electrochemically active material disposed along another current collecting layer.

9. The electrochemical cell assembly of claim 8, wherein the area of electrochemically active material on the second jellyroll assembly exterior comprises an entirety of the second jellyroll assembly exterior.

10. An electrochemical cell assembly, comprising:
a first cell; and
a second cell;
the first cell comprising:
a first anode and a first cathode, wound in a first jellyroll assembly with a first jellyroll assembly exterior defined by the first anode, a portion of the first anode extending along one or more turns of the first jellyroll assembly; the second cell comprising:
a second anode and a second cathode, wound in a second jellyroll assembly with a second jellyroll assembly exterior defined by the second cathode;
the first cell and the second cell arranged in a housing with the first jellyroll assembly exterior adjacent to the second jellyroll assembly exterior at a cathode to anode abutment;
the first anode comprising electrochemically active material disposed on an area of the first jellyroll assembly exterior;
the second cathode comprising another electrochemically active material selectively disposed on a portion of the second jellyroll assembly exterior; and
the area of the first jellyroll assembly exterior being greater than the portion of the second jellyroll assembly exterior.

11. The electrochemical cell assembly of claim 10, wherein the portion comprises only the cathode to anode abutment.

12. The electrochemical cell assembly of claim 10, further comprising a current collection layer, the another electrochemically active material disposed on both sides of the current collection layer.

13. The electrochemical cell assembly of claim 11, wherein the area of the first jellyroll assembly exterior comprises less than an entirety of the first jellyroll assembly exterior.

14. The electrochemical cell assembly of claim 10, wherein:
the first anode and the first cathode are separated by a first separator;

the second anode and the second cathode are separated by a second separator; and the first jellyroll assembly exterior and the second jellyroll assembly exterior are separated by an extension of one of the first separator or the second separator.

15. A method of manufacturing an electrochemical cell assembly, comprising:

selectively depositing an electrochemically active material on a current collection layer to obtain a first cathode;

forming a first jellyroll assembly from the first cathode, a first anode, and a first separator, the first jellyroll assembly including a first exterior defined by the first cathode, a portion of the first cathode extending along one or more turns of an interior of the first jellyroll assembly, the first exterior including the electrochemically active material deposited only on a portion of the first exterior;

forming a second jellyroll assembly from a second cathode, a second anode, and a second separator, the second jellyroll assembly including a second exterior defined by the second anode, the second exterior having an additional electrochemically active material disposed on an area of the second exterior; and disposing the first jellyroll assembly and the second jellyroll assembly in a housing with the portion of the first exterior adjacent to the area of the second exterior at a cathode to anode abutment, the area of the second exterior being greater than the portion of the first exterior.

16. The method of claim 15, further comprising selectively depositing the additional electrochemically active material to obtain the second anode.

17. The method of claim 15, wherein forming the second jellyroll assembly comprises forming the second jellyroll assembly to have a width greater than a width of the first jellyroll assembly such that the second anode extends beyond the first cathode at the cathode to anode abutment.

18. The method of claim 15, wherein:

forming the first jellyroll assembly comprises winding the first cathode, the first anode, and the first separator in one of a clockwise direction or a counter-clockwise direction; and forming the second jellyroll assembly comprises winding the second cathode, the second anode, and the second separator in the other of the clockwise direction or the counter-clockwise direction.

19. The method of claim 15, wherein the first jellyroll assembly includes a cathode portion of the first cathode having the electrochemically active material disposed only along an interior side of the current collection layer.

20. The method of claim 15, wherein the portion of the first exterior comprises less than an entirety of the first exterior.

* * * * *